United States Patent
Kobayashi

(10) Patent No.: US 10,518,582 B2
(45) Date of Patent: Dec. 31, 2019

(54) PNEUMATIC TIRE

(71) Applicant: The Yokohama Rubber Co., LTD., Minato-ku, Tokyo (JP)

(72) Inventor: Hironori Kobayashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 713 days.

(21) Appl. No.: 14/434,744

(22) PCT Filed: Oct. 10, 2012

(86) PCT No.: PCT/JP2012/076244
§ 371 (c)(1),
(2) Date: Apr. 9, 2015

(87) PCT Pub. No.: WO2014/057547
PCT Pub. Date: Apr. 17, 2014

(65) Prior Publication Data
US 2015/0283855 A1    Oct. 8, 2015

(51) Int. Cl.
*B60C 3/04* (2006.01)
*B60C 9/22* (2006.01)
(Continued)

(52) U.S. Cl.
CPC .................. *B60C 3/00* (2013.01); *B60C 3/04* (2013.01); *B60C 9/20* (2013.01); *B60C 9/2006* (2013.01);
(Continued)

(58) Field of Classification Search
CPC ..... B60C 3/04; B60C 11/033; B60C 11/0083; B60C 2011/0033; B60C 2011/0025; B60C 9/22
See application file for complete search history.

(56) References Cited

U.S. PATENT DOCUMENTS

| | | | | |
|---|---|---|---|---|
| 4,320,790 A | * | 3/1982 | Corner | B60C 11/11 152/209.27 |
| 6,247,512 B1 | * | 6/2001 | Radulescu | B60C 11/18 152/209.5 |

(Continued)

FOREIGN PATENT DOCUMENTS

| JP | H04-066304 | | 3/1992 |
|---|---|---|---|
| JP | 04-283108 A | * | 10/1992 |

(Continued)

OTHER PUBLICATIONS

Machine translation for Japan 4918948 B1 (no date).*

(Continued)

*Primary Examiner* — Steven D Maki
(74) *Attorney, Agent, or Firm* — Thorpe North & Western

(57) ABSTRACT

A pneumatic tire comprises: a carcass layer; a belt layer which is positioned to the outer side of the carcass layer in the tire radial direction; and a rubber tread which is positioned on the outer side of the belt layer in the tire radial direction. The belt layer is formed by laminating a pair of intersecting belts having belt angle with absolute values of 10 to 45° and mutually opposite-signed belt angles, and a circumferential reinforcing layer having a belt angle which is within a range of ±5° with respect to the tire circumferential direction. A distance (Gcc) from the tread profile to the tire inner circumferential surface along the tire equatorial plane, and a distance (Gsh) from a tread end to the tire inner circumferential surface have a relationship satisfying 1.10≤Gsh/Gcc.

17 Claims, 10 Drawing Sheets

(51) Int. Cl.
*B60C 11/00* (2006.01)
*B60C 3/00* (2006.01)
*B60C 11/04* (2006.01)
*B60C 9/20* (2006.01)
*B60C 11/03* (2006.01)
*B60C 11/01* (2006.01)

(52) U.S. Cl.
CPC ............ *B60C 9/22* (2013.01); *B60C 11/0083* (2013.01); *B60C 11/01* (2013.01); *B60C 11/03* (2013.01); *B60C 11/033* (2013.01); *B60C 11/04* (2013.01); *B60C 2009/2064* (2013.01); *B60C 2009/2083* (2013.01); *B60C 2009/2266* (2013.01); *B60C 2011/0025* (2013.01); *B60C 2011/0033* (2013.01); *B60C 2200/06* (2013.01)

(56) References Cited

U.S. PATENT DOCUMENTS

| | | | |
|---|---|---|---|
| 6,401,778 | B1 | 6/2002 | Cluzel |
| 2005/0006018 | A1* | 1/2005 | Maruoka .................. B60C 3/04 152/454 |
| 2006/0169380 | A1 | 8/2006 | Radulescu et al. |
| 2006/0169381 | A1* | 8/2006 | Radulescu ............ B60C 9/2006 152/531 |
| 2006/0169383 | A1 | 8/2006 | Radulescu et al. |
| 2008/0149241 | A1 | 6/2008 | Maruyama et al. |
| 2009/0277557 | A1* | 11/2009 | Suzuki .................. B60C 9/2006 152/532 |
| 2012/0097307 | A1* | 4/2012 | Delebecq .................. B60C 3/04 152/527 |
| 2014/0305566 | A1* | 10/2014 | Mashiyama .............. B60C 9/18 152/454 |
| 2014/0326380 | A1 | 11/2014 | Kotoku |

FOREIGN PATENT DOCUMENTS

| | | |
|---|---|---|
| JP | 2001-522748 | 11/2001 |
| JP | 2004-098838 | 4/2004 |
| JP | 2007-131106 | 5/2007 |
| JP | 2008-001264 | 1/2008 |
| JP | 2009-018629 | 1/2009 |
| JP | 4642760 | 3/2011 |
| JP | 4663638 | 4/2011 |
| JP | 4663639 | 4/2011 |
| JP | 2012-035652 | 2/2012 |
| JP | 4918948 | 4/2012 |
| JP | 4918948 B1 * | 4/2012 |
| JP | 4984013 | 7/2012 |
| WO | WO-98/58810 A1 * | 12/1998 |
| WO | WO 99-024269 | 5/1999 |
| WO | WO 2005/016666 | 2/2005 |
| WO | WO 2005/016667 | 2/2005 |
| WO | WO 2005/016668 | 2/2005 |
| WO | WO 2007-055065 | 5/2007 |
| WO | WO 2007/148447 | 12/2007 |
| WO | WO 2013/042256 | 3/2013 |

OTHER PUBLICATIONS

Machine translation for Japan 04-283108 (Year: 2018).*
International Search Report for International Application No. PCT/JP2012/076244 dated Jan. 15, 2013, 4 pages, Japan.

* cited by examiner

| | Conventional Example | WORKING EXAMPLES 1 | WORKING EXAMPLES 2 | WORKING EXAMPLES 3 | WORKING EXAMPLES 4 | WORKING EXAMPLES 5 | WORKING EXAMPLES 6 | WORKING EXAMPLES 7 |
|---|---|---|---|---|---|---|---|---|
| Circumferential reinforcing layer | Yes | Yes | Yes | Yes | Yes | Yes | Yes | Yes |
| Gsh/Gcc | 1.06 | 1.10 | 1.20 | 1.25 | 1.25 | 1.25 | 1.25 | 1.10 |
| Dt/SH | 0.024 | 0.015 | 0.015 | 0.010 | 0.010 | 0.010 | 0.010 | 0.010 |
| De/Dt | 0.23 | 0.23 | 0.23 | 0.23 | 0.25 | 0.30 | 0.35 | 0.25 |
| Wsh/TW | 0.22 | 0.22 | 0.22 | 0.22 | 0.22 | 0.22 | 0.22 | 0.10 |
| Wsh/Wcc | 1.25 | 1.25 | 1.25 | 1.25 | 1.25 | 1.25 | 1.25 | 1.25 |
| A | 0.19 | 0.19 | 0.19 | 0.19 | 0.19 | 0.19 | 0.19 | 0.19 |
| tanδ | 0.09 | 0.09 | 0.09 | 0.09 | 0.09 | 0.09 | 0.09 | 0.09 |
| Wet performance | 100 | 105 | 106 | 108 | 110 | 111 | 112 | 114 |

FIG. 8A

| | WORKING EXAMPLES 8 | WORKING EXAMPLES 9 | WORKING EXAMPLES 10 | WORKING EXAMPLES 11 | WORKING EXAMPLES 12 | WORKING EXAMPLES 13 | WORKING EXAMPLES 14 |
|---|---|---|---|---|---|---|---|
| Circumferential reinforcing layer | Yes | Yes | Yes | Yes | Yes | Yes | Yes |
| Gsh/Gcc | 1.20 | 1.25 | 1.25 | 1.25 | 1.20 | 1.10 | 1.25 |
| Dt/SH | 0.010 | 0.010 | 0.010 | 0.010 | 0.010 | 0.010 | 0.010 |
| De/Dt | 0.25 | 0.35 | 0.35 | 0.35 | 0.25 | 0.25 | 0.35 |
| Wsh/TW | 0.10 | 0.10 | 0.13 | 0.16 | 0.20 | 0.20 | 0.13 |
| Wsh/Wcc | 1.25 | 1.25 | 1.25 | 1.25 | 1.25 | 1.25 | 0.80 |
| A | 0.19 | 0.19 | 0.19 | 0.19 | 0.19 | 0.19 | 0.19 |
| tanδ | 0.09 | 0.09 | 0.09 | 0.09 | 0.09 | 0.09 | 0.09 |
| Wet performance | 115 | 116 | 118 | 117 | 116 | 115 | 120 |

FIG. 8B

| | WORKING EXAMPLES 15 | WORKING EXAMPLES 16 | WORKING EXAMPLES 17 | WORKING EXAMPLES 18 | WORKING EXAMPLES 19 | WORKING EXAMPLES 20 | WORKING EXAMPLES 21 |
|---|---|---|---|---|---|---|---|
| Circumferential reinforcing layer | Yes | Yes | Yes | Yes | Yes | Yes | Yes |
| Gsh/Gcc | 1.25 | 1.25 | 1.25 | 1.25 | 1.25 | 1.25 | 1.25 |
| Dt/SH | 0.010 | 0.010 | 0.010 | 0.010 | 0.010 | 0.010 | 0.010 |
| De/Dt | 0.35 | 0.35 | 0.35 | 0.35 | 0.35 | 0.35 | 0.35 |
| Wsh/TW | 0.13 | 0.13 | 0.13 | 0.13 | 0.13 | 0.13 | 0.13 |
| Wsh/Wcc | 1.00 | 1.20 | 1.00 | 1.00 | 1.00 | 1.00 | 1.00 |
| A | 0.19 | 0.19 | 0.20 | 0.23 | 0.23 | 0.23 | 0.23 |
| tanδ | 0.09 | 0.09 | 0.09 | 0.09 | 0.10 | 0.12 | 0.14 |
| Wet performance | 122 | 121 | 124 | 125 | 126 | 127 | 128 |

FIG. 8C

PNEUMATIC TIRE

TECHNICAL FIELD

The present technology relates to a pneumatic tire, and in particular to a pneumatic tire with improved wet performance.

BACKGROUND

Recently, tires for heavy loads mounted on trucks, buses, and the like are able to retain the shape of the tread portion due to the tires having a low aspect ratio on the one hand and due to the disposition of a circumferential reinforcing layer in the belt layer on the other hand. The circumferential reinforcing layer is a belt ply having a belt angle that is substantially 0° with respect to the tire circumferential direction, and is disposed so as to be laminated upon a pair of cross belts. The technologies disclosed in Japanese Patent Nos. 4642760B, 4663638B and 4663639B are conventional pneumatic tires that are configured in this manner. There is a problem with the pneumatic tire in that improvement in wet performance is expected.

SUMMARY

The present technology provides a pneumatic tire with improved wet performance.

A pneumatic tire according to the present technology comprises a carcass layer, a belt layer disposed on the outer side of the carcass layer in the tire radial direction, and a tread rubber disposed on the outer side of the belt layer in the tire radial direction, and provided with at least three circumferential main grooves that extend in the tire circumferential direction and a plurality of land portions that are demarcated by the circumferential main grooves; wherein, the belt layer is formed by laminating a pair of cross belts having a belt angle not less than 10° and not greater than 45° in absolute values and having belt angles of mutually opposite signs, and a circumferential reinforcing layer having a belt angle within a range of ±5° with respect to the tire circumferential direction; a distance Gcc from the tread profile to the tire inner circumferential surface along the tire equatorial plane, and a distance Gsh from the tread end to the tire inner circumferential surface having a relationship satisfying 1.10≤Gsh/Gcc; and a shoulder drop amount Dt of the tread profile at the tire ground contact end and the outer diameter SH of the tread profile along the tire equatorial plane has a relationship satisfying Dt/SH≤0.015.

In a pneumatic tire configuration according to the present technology, (1) a ratio Gsh/Gcc is increased whereby the tread surface has a flat shape (approximately parallel to the tire rotational axis) as a whole and the volume (distance Gsh) of a tread rubber 15 at the shoulder portion is ensured (see FIGS. 1 and 2). As a result, the amount of deformation of the shoulder portion while the tire is in contact with the ground is reduced and the stiffness of the shoulder land portion is properly ensured. Further, (2) the shoulder drop amount Dt of the tread profile at the tire ground contact end T is made appropriate. Consequently, the ground contact patch pressure of a shoulder land portion 3 while the tire is in contact with the ground is increased which is advantageous in improving the wet performance of the tire.

BRIEF DESCRIPTION OF THE DRAWINGS

FIGS. 8A-8C include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituent elements which can possibly or obviously be substituted while maintaining consistency with the present technology are included in the configurations of the embodiments. Furthermore, a plurality of modified examples that are described in the embodiment can be freely combined within a scope of obviousness for a person skilled in the art.

Pneumatic Tire

Figure 1:
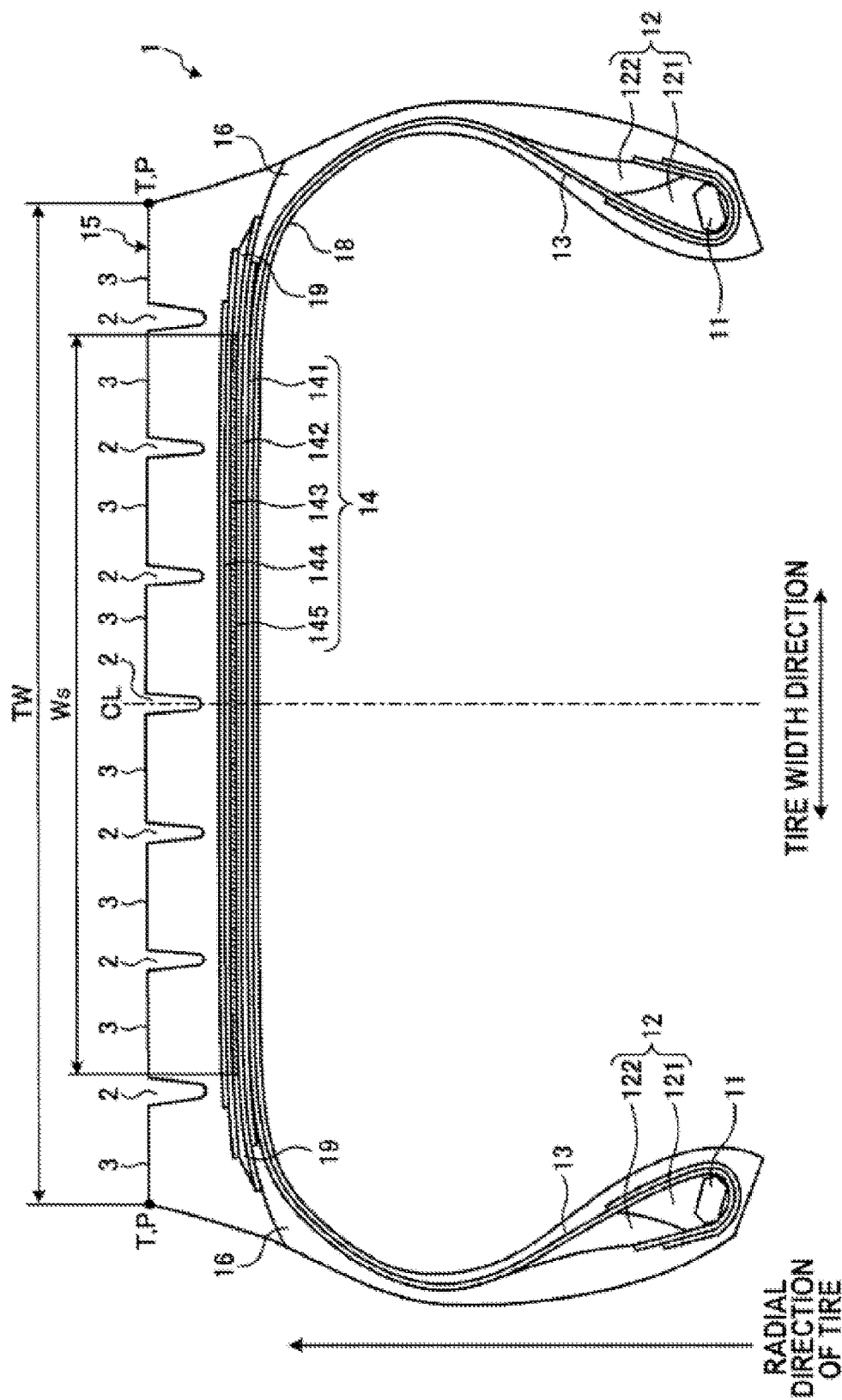
FIG. 1 is a cross-sectional view from the tire meridian direction illustrating a pneumatic tire according to an embodiment of the present technology.

FIG. 1 is a cross-sectional view from the tire meridian direction illustrating a pneumatic tire according to an embodiment of the present technology. In FIG. 1, a radial tire for heavy loads that is mounted on trucks, buses, and the like for long-distance transport is illustrated as an example of the pneumatic tire 1. Note that the symbol CL refers to a tire equator plane. Moreover, a tread end P and a tire ground contact end T are in accord with each other in FIG. 1. The circumferential reinforcing layer 145 in FIG. 1 is indicated by hatching.

A pneumatic tire 1 includes a pair of bead cores 11,11, a pair of bead fillers 12,12, a carcass layer 13, a belt layer 14, tread rubber 15, and a pair of side wall rubbers 16,16 (see FIG. 1).

The pair of bead cores 11,11 have annular structures and configure cores of left and right bead portions. The pair of bead fillers 12,12 are formed from a lower filler 121 and an upper filler 122, and are disposed on the outer circumference of each of the pair of bead cores 11,11 in the tire radial direction so as to reinforce the bead portions.

The carcass layer 13 stretches between the left and right side bead cores 11 and 11 in toroidal form, forming a framework for the tire. Additionally, both ends of the carcass layer 13 are folded from the inner side in the tire width direction toward the outer side in the tire width direction and are fixed so as to wrap around the bead cores 11 and the bead fillers 12. Also, the carcass layer 13 is configured by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not greater than 95°.

The belt layer 14 is formed by laminating a plurality of belt plies 141 to 145, and is disposed to extend over the outer circumference of the carcass layer 13. A detailed configuration of the belt layer 14 is described below.

The tread rubber 15 is disposed on an outer circumference in the tire radial direction of the carcass layer 13 and the belt layer 14, and forms a tread portion of the tire. The pair of side wall rubbers 16, 16 is disposed on the respective outer sides of the carcass layer 13 in the tire width direction so as to form left and right sidewall portions of the tire.

In the configuration illustrated in FIG. 1, the pneumatic tire 1 includes seven circumferential main grooves 2 that extend in a tire circumferential direction, and eight land portions 3 partitioned and formed by the circumferential main grooves 2. The land portions 3 are formed of blocks that are segmented in the tire circumferential direction by ribs or lug grooves (not illustrated) that continue in the tire circumferential direction.

Here, "circumferential main grooves" refer to circumferential grooves having a groove width of 5.0 mm or greater. The groove widths of the circumferential main grooves are measured excluding the notched portions and/or the chamfered portions formed on the groove opening portion.

Additionally, in the pneumatic tire 1, the left and right outermost circumferential main grooves 2, 2 in the tire width direction are referred to as outermost circumferential main grooves. Moreover, the left and right land portions 3, 3 on the outer side in the tire width direction that are demarcated by the left and right outermost circumferential main grooves 2, 2 are referred to as shoulder land portions.

[Belt Layer]

Figure 2:
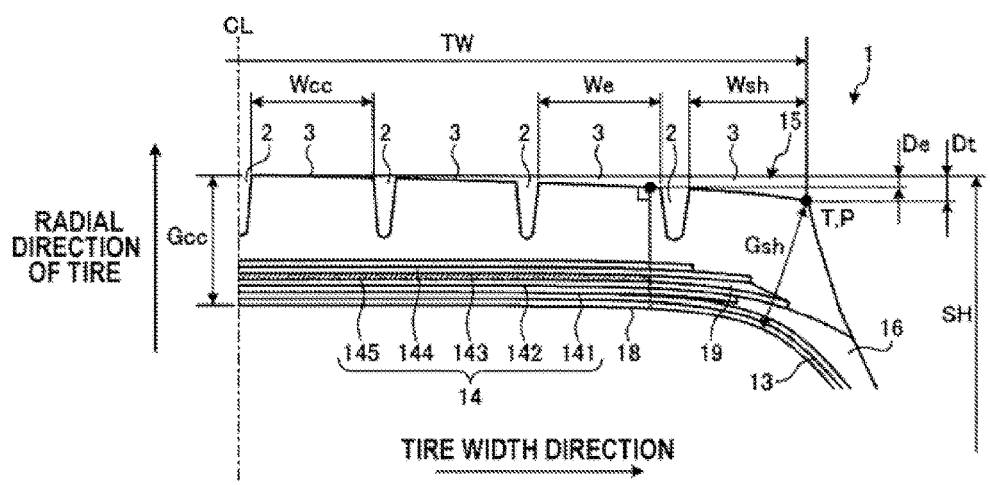
FIG. 2 is an explanatory view illustrating a belt layer of the pneumatic tire depicted in FIG. 1.
Figure 3:
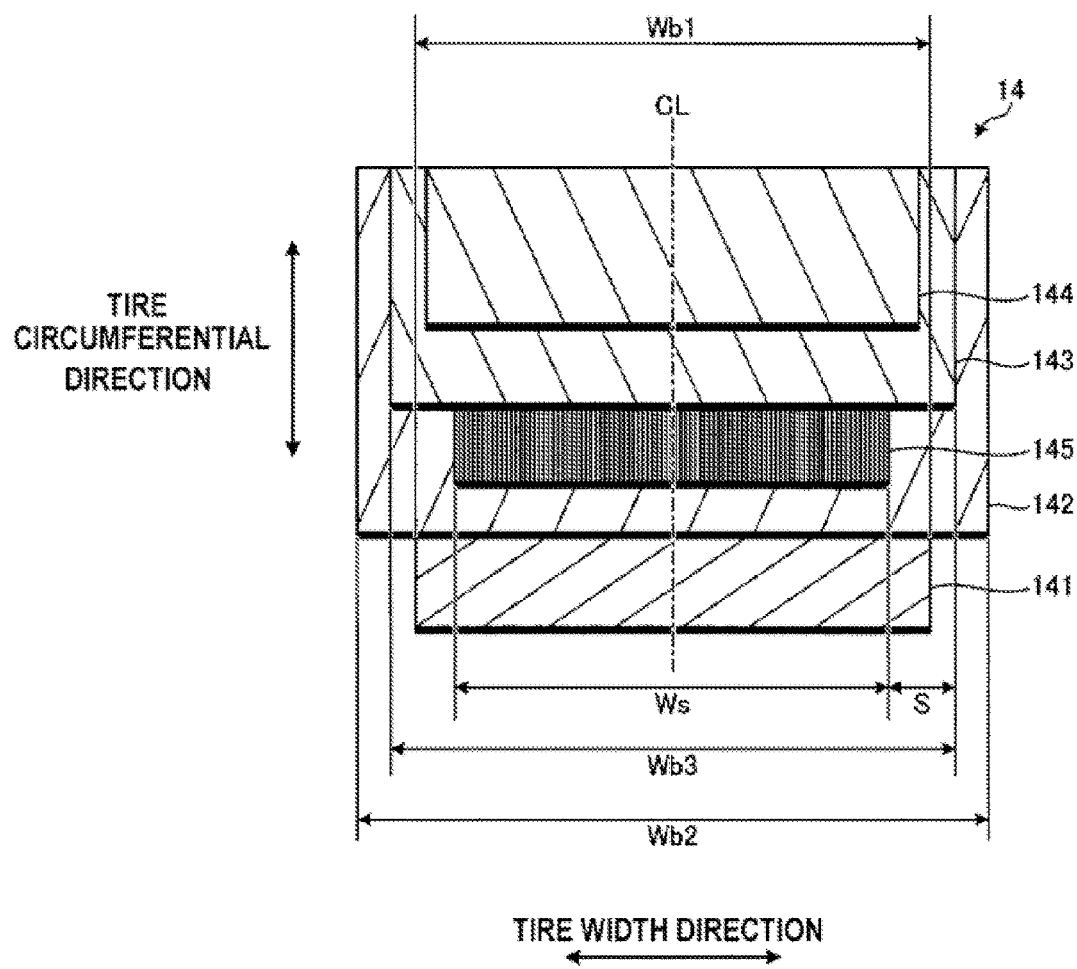
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a laminated structure of the belt layer 14. Further, the thin lines in the belt plies 141 to 145 in FIG. 3 schematically represent the respective belt cords of the belt plies 141 to 145.

The belt layer 14 is formed by laminating a large angle belt 141, a pair of cross belts 142, 143, a belt cover 144, and a circumferential reinforcing layer 145, and is disposed by being wound and mounted onto the outer circumference of the carcass layer 13 (see FIG. 2).

The large angle belt 141 is configured by a plurality of belt cords formed from steel or organic fibers, covered by coating rubber, and subjected to a rolling process, and has a belt angle (angle of inclination of the fiber direction of the belt cords with respect to the tire circumferential direction), as an absolute value, of not less than 45° and not greater than 70°. Moreover, the large angle belt 141 is disposed laminated on the outer side of the carcass layer 13 in the tire radial direction.

The pair of cross belts 142, 143 are configured by a plurality of belt cords formed from steel or organic fibers, covered by coating rubber, and subjected to a rolling process, having a belt angle, as an absolute value, of not less than 10° and not greater than 45°. Additionally, the pair of cross belts 142, 143 have belt angles that are of mutually opposite signs, and are laminated so that the fiber directions of the belt cords intersect each other (a crossply structure). In the following description, the cross belt 142 positioned on the inner side in the tire radial direction is referred to as an "inner-side cross belt", and the cross belt 143 positioned on the outer side in the tire radial direction is referred to as an "outer-side cross belt". Three or more cross belts may be disposed laminated (not illustrated). Moreover, the pair of cross belts 142, 143 are disposed laminated on the outer side of the large angle belt 141 in the tire radial direction.

The belt cover 144 is configured by a plurality of belt cords formed from steel or organic fibers, covered by coating rubber, and subjected to a rolling process, having a belt angle, as an absolute value, of not less than 10° and not greater than 45°. Moreover, the belt cover 144 is disposed laminated on the outer side of the cross belts 142, 143 in the tire radial direction. In this embodiment, the belt cover 144 has the same belt angle as the outer-side cross belt 143, and is disposed in the outermost layer of the belt layer 14.

The circumferential reinforcing layer 145 is configured by belt cords formed from steel and covered by coating rubber that are wound in a spiral manner with an inclination within a range of ±5° with respect to the tire circumferential direction. Additionally, the circumferential reinforcing layer 145 is disposed so as to be interposed between the pair of cross belts 142, 143. The circumferential reinforcing layer 145 is disposed on the inner side of the left and right edge portions of the pair of cross belts 142, 143 in the tire width direction. Specifically, the circumferential reinforcing layer 145 is formed by winding one or a plurality of wires in a spiral manner around the outer circumference of the inner-side cross belt 142. The circumferential reinforcing layer 145 reinforces the stiffness in the tire circumferential direction. As a result, the tire durability is improved.

In the pneumatic tire 1, the belt layer 14 may have an edge cover (not illustrated). Generally, the edge cover is configured by a plurality of belt cords formed from steel or organic fibers covered by coating rubber and subjected to a rolling process, and the belt cords have a belt angle, as an absolute value, of not less than 0° and not greater than 5°. Additionally, the edge covers are disposed on the outer side of the left and right edge portions of the outer-side cross belt 143 (or the inner-side cross belt 142) in the tire radial direction. As a result of the hoop effect of the edge cover, the difference in radial growth of a tread center region and a shoulder region is reduced, and the uneven wear resistance performance of the tire is improved.

(Improved Wet Performance Structure)

Recently, tires for heavy loads mounted on trucks and buses and the like retain the shape of the tread portion due to the tires having a low aspect ratio on the one hand and due to the disposition of the circumferential reinforcing layer in the belt layer on the other hand. Specifically, by disposing the circumferential reinforcing layer at the center region of the tread portion, and exploiting the hoop effect thereof, radial growth of the tread portion is suppressed and the shape of the tread portion is maintained.

While the flat shape of the ground contact patch is maintained due to the circumferential reinforcing layer in the center region of the tread portion in this configuration, the tread portion may easily exhibit a shoulder drop shape in the region to the outer side in the tire width direction from the edge of the circumferential reinforcing layer. As a result, there is a problem that the ground contact patch pressure of the shoulder land portion is reduced and the wet performance of the tire is reduced.

Accordingly, the pneumatic tire 1 employs the following configuration to improve wet performance (see FIGS. 1 to 3).

As illustrated in FIG. 2 in the pneumatic tire 1, a distance $Gcc$ from the tread profile to the tire inner circumferential surface along the tire equatorial plane CL, and a distance $Gsh$ from the tread end P to the tire inner circumferential surface preferably have a relationship satisfying $1.10 \leq Gsh/Gcc$. In particular, the ratio $Gsh/Gcc$ is preferably within a range satisfying $1.20 \leq Gsh/Gcc$ as shown by the below mentioned results of performance tests (see FIG. 8). Consequently, the wet performance of the tire is effectively improved.

Conversely, while the upper limit of the ratio Gsh/Gcc is not limited in particular, the radius at the tread end P of the tread profile is preferably equal to or less than the radius at the tire equatorial plane CL when the tire is mounted on a specified rim and inflated to a specified inner pressure when no load is applied. That is, the tread profile is configured to have a linear shape or an arc shape having the center on the inner side in the tire radial direction so as not to assume an inverse R shape (an arc shape having the center on the outer side in the tire radial direction). For example, the upper limit of the ratio Gsh/Gcc is about 1.4 to 1.5 in the configuration having a square-shaped shoulder portion as in FIG. 2. Conversely, the upper limit of the ratio Gsh/Gcc is about 1.3 to 1.4 in the configuration having a round-shaped shoulder portion as in FIG. 6.

The distance Gcc is measured as the distance from the intersection of the tire equatorial plane CL and the tread profile to the intersection of the tire equatorial plane CL and the tire inner circumferential surface when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured omitting the circumferential main groove 2. The distance Gsh is measured as the length of a perpendicular line from the tread end P to the tire inner circumferential surface when viewed as a cross-section from the tire meridian direction.

In the configuration illustrated in FIG. 2, the pneumatic tire 1 includes an innerliner 18 on the inner circumferential surface of the carcass layer 13, and the innerliner 18 is disposed across the entire region of the tire inner circumferential surface. In such a configuration, the distance Gcc and the distance Gsh are measured from the outer surface of the innerliner 18 (tire inner circumferential surface).

The tread end P refers to a point of the tread edge portion in a configuration having a (1) square-shaped shoulder portion. For example, in the configuration illustrated in FIG. 2, the tread end P and a tire ground contact end T are in accord with each other due to the shoulder portion having a square shape. Conversely, as illustrated in (2) in FIG. 6 where the shoulder portion has a round shape, an intersection P' is taken from the profile of the tread portion and the profile of a sidewall portion when viewed as a cross-section from the tire meridian direction, and the tread end P is taken as the bottom of a perpendicular line drawn from the intersection P' to the shoulder portion.

Additionally, the "tire ground contact end T" refers to the maximum width position in a tire axial direction of a contact surface between the tire and a flat plate in a configuration in which the tire is assembled on a specified rim, filled with specified inner pressure, placed perpendicularly to the flat plate in a static state, and loaded with a load corresponding to a specified load.

Herein, "specified rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Specified inner pressure" refers to "maximum air pressure" stipulated by JATMA, a maximum value in "tire load limits at various cold inflation pressures" defined by TRA, and "inflation pressures" stipulated by ETRTO. Note that "specified load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the specified inner pressure is an air pressure of 180 kPa, and the specified load is 88% of the maximum load capacity.

Figure 4:
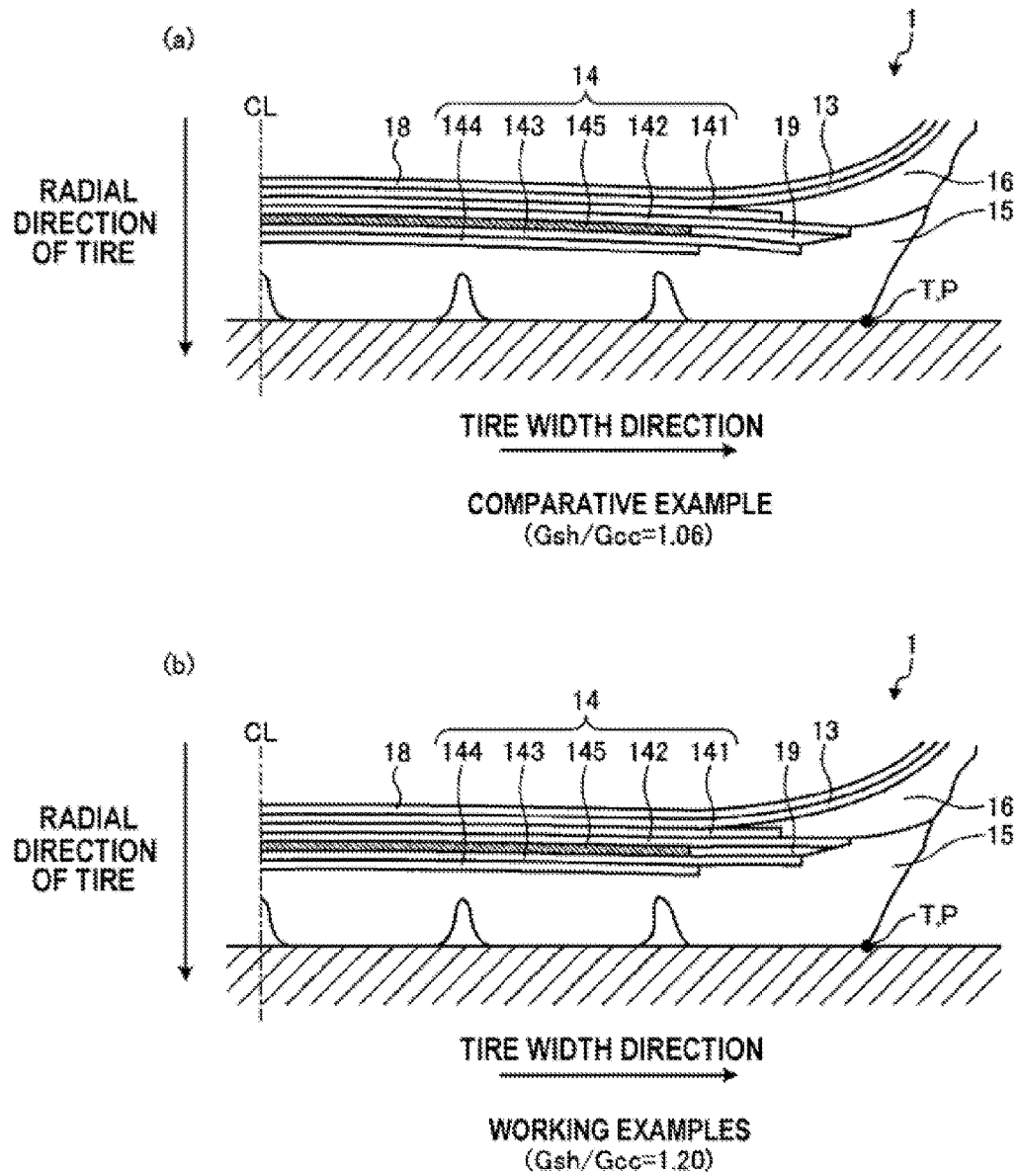
FIG. 4 is an explanatory view illustrating the effect of the pneumatic tire depicted in FIG. 1.
Figure 5:
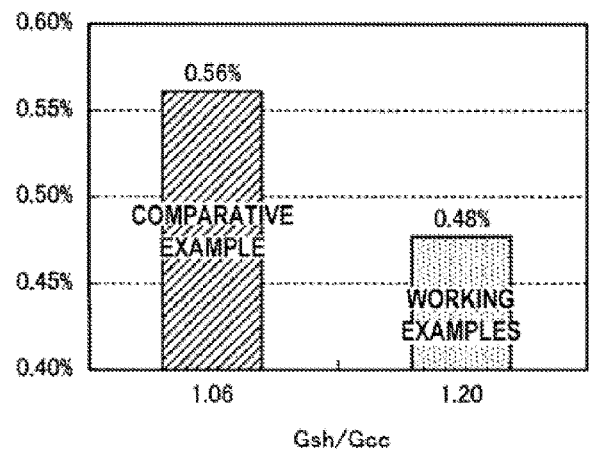
FIG. 5 is an explanatory view illustrating the effect of the pneumatic tire depicted in FIG. 1.

FIGS. 4 and 5 are explanatory views illustrating effects of the pneumatic tire depicted in FIG. 1. Among these drawings, FIGS. 4A and 4B illustrate ground contact states of tires having different ratios Gsh/Gcc, and FIG. 5 illustrates amounts of deviation (distortion of the end portion of the belt cords of the circumferential reinforcing layer 145) of the shoulder portions for each of the tires illustrated in FIG. 4 in contact with the ground.

The ratio Gsh/Gcc from the configurations illustrated in FIGS. 1 to 3 is decreased in the tire of the comparative example illustrated in FIG. 4A (Gsh/Gcc=1.06). As a result, the tread profile has a shoulder drop shape in which the outer diameter from the tire equatorial plane CL toward the tread end P is reduced when the tire is not in contact with the ground (not illustrated). As a result, when the tire is in contact with the ground as illustrated in FIG. 4A, the road surface side (outer side in the tire radial direction) of the tread rubber 15 at the shoulder portion exhibits a large deviation and the belt plies 141 to 145 of the belt layer 14 exhibit a large amount of bending on the road surface side (outer side in the tire radial direction). Consequently, displacement in the radial direction with respect to the road surface of the shoulder portion while the tire is in contact with the ground increases, and as a result the ground contact patch pressure of the shoulder land portion decreases and the wet performance decreases.

The ratio Gsh/Gcc from the configurations illustrated in FIGS. 1 to 3 is increased in the tire of the embodiment illustrated in FIG. 4B (Gsh/Gcc=1.20). As a result, the difference in diameter of the outer diameter at the tread end P and the outer diameter along the tire equatorial plane CL in the tread profile is reduced and the tread surface has a flat shape (approximately parallel to the tire rotational axis) as a whole (see FIGS. 1 and 2). The volume of the tread rubber 15 at the shoulder portion (distance Gsh) is disposed in a suitable manner whereby displacement in the radial direction with respect to the road surface of the shoulder portion when the tire is in contact with the ground is reduced. As a result, the ground contact patch pressure of the shoulder land portion is increased and the wet performance of the tire is improved.

A shoulder drop amount Dt of the tread profile at the tire ground contact end T in the pneumatic tire 1 illustrated in FIG. 2 and an outer diameter SH of the tread profile at the tire equatorial plane CL has a relationship satisfying $0 \leq Dt/SH \leq 0.015$. The ratio Dt/SH preferably is within a range satisfying $0.005 \leq Dt/SH \leq 0.010$. The ground contact patch pressure of the shoulder land portion 3 while the tire is in contact with the ground is properly ensured due to $Dt/SH \leq 0.010$ being satisfied, and any adverse effect due to the generation of heat in the shoulder portion is reduced due to $0.005 \leq Dt/SH$ being satisfied.

When the shoulder drop amount Dt is within a range satisfying $0 \leq Dt$ while the inner side (shoulder drop side) in the tire radial direction is positive, the outer diameter of the tread profile at the tire ground contact end T is equal to the outer diameter SH of the tread profile at the tire equatorial plane CL when Dt=0. Therefore, the shoulder drop amount Dt is set so that Dt is not less than zero and is within a range such that the tread profile does not form an inverse R shape.

The shoulder drop amount Dt is measured when the tire is assembled on a specified rim, inflated to a specified inner pressure, and no load is applied.

A shoulder drop amount De of the tread profile at the end portion of the circumferential reinforcing layer 145 and the shoulder drop amount Dt of the tread profile at the tire ground contact end T has a relationship satisfying $0.25 \leq De/Dt \leq 0.65$. Therefore, De is less than Dt and the profile of the shoulder land portion 3 has a shape that exhibits a shoulder drop toward the tire width direction outer side as viewed in a cross-section from the tire meridian direction.

When the lower limit of shoulder drop amount De is within a range satisfying $0 \leq De$ while the inner side (shoulder drop side) in the tire radial direction is positive, the outer diameter of the tread profile at the end portion of the circumferential reinforcing layer 145 and the outer diameter of the tread profile at the tire ground contact end T are equal to the outer diameter SH of the tread profile at the tire equatorial plane CL when $De=Dt=0$.

Figure 6:
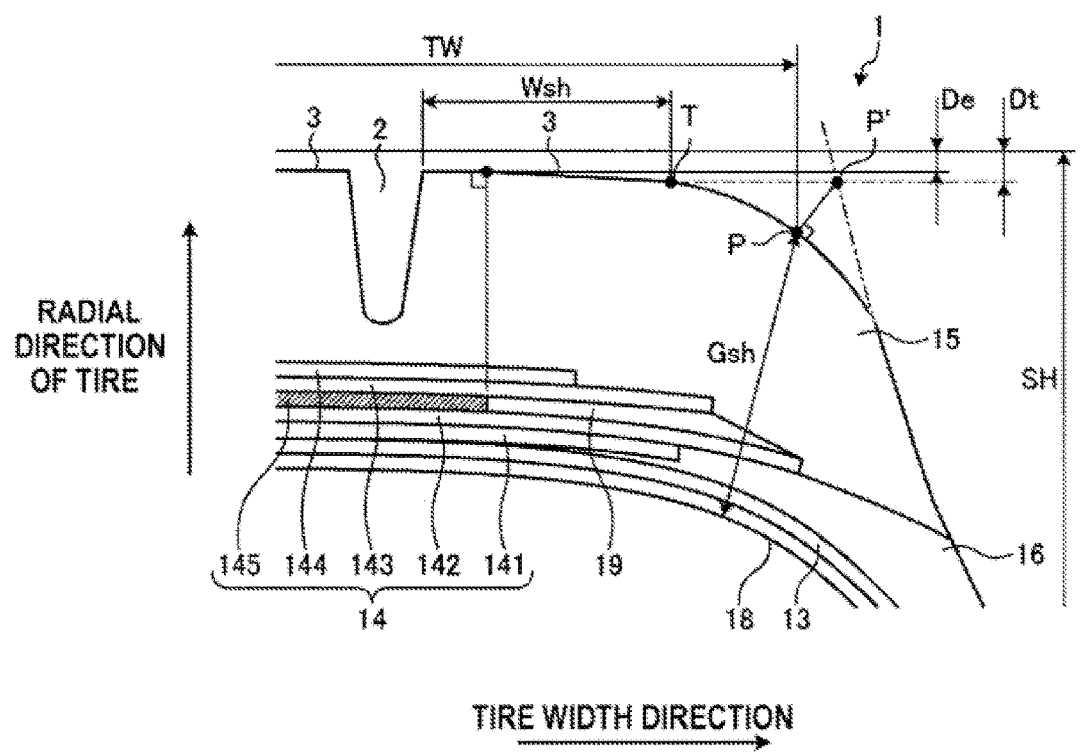
FIG. 6 is an explanatory view illustrating a modified example of the pneumatic tire depicted in FIG. 1.

As illustrated in FIGS. 2 and 6, the shoulder drop amount De is measured on the basis of the bottom of a perpendicular line drawn from the end portion of the circumferential reinforcing layer 145 to the tread profile. The shoulder drop amount De is measured when the tire is assembled on a specified rim, inflated to a specified inner pressure, and no load is applied.

A ground contact width Wsh of the shoulder land portion 3 and a tread width TW in FIG. 2 have a relationship satisfying $0.1 \leq Wsh/TW \leq 0.2$. This provides an appropriate ground contact width Wsh of the shoulder land portion 3.

The ground contact width Wsh of the shoulder land portion 3 is a distance in the tire rotational axis direction from the edge portion on the circumferential main groove 2 side to the tire ground contact end T of the shoulder land portion 3, and is measured when the tire is assembled on a specified rim, inflated to a specified inner pressure, and no load is applied. The ground contact width Wsh is calculated as an average value over the entire tire circumference in a configuration in which the outermost circumferential main groove 2 extends in a zigzag manner in the tire circumferential direction or in a configuration in which the outermost circumferential main groove 2 has notched portions or chamfered portions on the edge portion.

The tread width TW is the distance in the direction of the tire rotational axis between the left and right tread ends P, P, measured when the tire is assembled on a specified rim, inflated to a specified inner pressure and no load is applied.

A ground contact width Wcc of the land portion 3 closest to the tire equatorial plane CL and a ground contact width Wsh of the shoulder land portion 3 in FIG. 2 has a relationship satisfying $0.80 \leq Wsh/Wcc \leq 1.20$.

The land portion 3 closest to the tire equatorial plane CL refers to the land portion 3 when the land portion 3 is on the tire equatorial plane CL. When the circumferential main groove 2 is on the tire equatorial plane CL, the land portion 3 closest to the tire equatorial plane CL refers to the land portion 3 on the same side as the shoulder land portion 3 used in the comparison among the left and right land portions 3 demarcated by the circumferential main groove 2. For example, the ratio Wsh/Wcc between the ground contact width Wcc of the land portion 3 closest to the tire equatorial plane CL and the ground contact width Wsh of the shoulder land portion 3 is measured in a region on one side separated by the tire equatorial plane CL when the circumferential direction main groove 2 is on the tire equatorial plane CL in a configuration having a tread pattern without left-right symmetry (not illustrated).

The ground contact width Wcc of the land portion 3 is measured when the tire is assembled on a specified rim, inflated to a specified inner pressure, and no load is applied.

The ground contact width Wcc is calculated as an average value over the entire tire circumference in a configuration in which the outermost circumferential main groove 2 extends in a zigzag manner in the tire circumferential direction or in a configuration in which the outermost circumferential main groove 2 has notched portions or chamfered portions on the edge portion.

The tread width TW and the width Ws of the circumferential reinforcing layer 145 in FIG. 1 preferably has a relationship satisfying $0.70 \leq Ws/TW \leq 0.90$.

The width Ws of the circumferential reinforcing layer 145 is a distance in the tire rotational axis direction between the left and right end portions of the circumferential reinforcing layer 145 and is measured when the tire is assembled on a specified rim, inflated to a specified inner pressure, and no load is applied. The width Ws of the circumferential reinforcing layer 145 is the distance between the outermost end portions of the divided portions when the circumferential reinforcing layer 145 has a structure that is divided in the tire width direction (not illustrated).

A pneumatic tire generally has a structure having left-right symmetry centered on the tire equatorial plane CL as illustrated in FIG. 1. As a result, the distance from the tire equatorial plane CL to the tread end P is TW/2, and the distance from the tire equatorial plane CL to the circumferential reinforcing layer 145 is Ws/2.

In contrast, the range of the abovementioned ratio Ws/TW between the tread width TW and the width Ws of the circumferential reinforcing layer is defined by converting the widths to half widths from the tire equatorial plane CL in a pneumatic tire having a structure without left-right symmetry (not illustrated). Specifically, a distance TW' from the tire equatorial plane CL to the tread end P (not illustrated) and a distance Ws' from the tire equatorial plane CL to the end portion of the circumferential reinforcing layer 145 is set to have a relationship satisfying $0.70 \leq Ws'/TW' \leq 0.90$.

A groove area ratio A in the tire ground contact patch in the pneumatic tire 1 is in a range satisfying $0.20 \leq A \leq 0.30$.

The groove area ratio is defined as groove area/(groove area+ground contact area). "Groove area" refers to the opening area of the grooves in the ground contact patch. "Groove" refers to the circumferential grooves and the lug grooves in the tread portion and does not include sipes, kerfs, and notches. "Ground contact area" refers to the contact area between the tire and the road surface. Note that the groove area and the ground contact area are measured at a contact surface between a tire and a flat plate in a configuration in which the tire is mounted on a specified rim, filled to a specified inner pressure, placed perpendicularly with respect to the flat plate in a static state, and loaded with a load corresponding to a specified load.

A loss tangent tan δ of the tread rubber 15 is in a range satisfying $0.10 \leq \tan \delta$ in the pneumatic tire 1.

The loss tangent tan δ is measured by using a viscoelastic spectrometer under the conditions of a temperature of 20° C., a shearing strain of 10%, and a frequency of 20 Hz.

Additionally, a width Wb1 of the large angle belt 141 and a width Wb3 of the narrower cross belt 143 of the pair of cross belts 142, 143 preferably have a relationship satisfying $0.85 \leq Wb1/Wb3 \leq 1.05$ (see FIG. 3). As a result, the ratio Wb1/Wb3 is made appropriate.

The width Wb1 of the large angle belt 141 and the width Wb3 of the cross belt 143 are measured as distances in the tire width direction when the tire is assembled on a specified rim, inflated to a specified inner pressure, and no load is applied.

In the configuration in FIG. 1, the belt layer 14 has a structure with left-right symmetry around the tire equatorial plane CL as illustrated in FIG. 3, and the width Wb1 of the large angle belt 141 and the width Wb3 of the narrower cross belt 143 have a relationship satisfying Wb1≤Wb3. As a result, an edge portion of the large angle belt 141 is disposed on an inner side in the tire width direction than the edge portion of the narrower cross belt 143 in a region on either side of the tire equatorial plane CL. However, the configuration is not limited thereto, and the width Wb1 of the large angle belt 141 and the width Wb3 of the narrower cross belt 143 may have a relationship satisfying Wb1≥Wb3 (not illustrated).

Moreover, belt cords of the large angle belt 141 are preferably steel wire, and the number of ends is preferably not less than 15 ends/50 mm and not greater than 25 ends/50 mm (see FIG. 4). The belt cords of the pair of cross belts 142, 143 are preferably steel wire, and the number of ends is preferably is not less than 18 ends/50 mm and not greater than 28 ends/50 mm. The belt cords of the circumferential reinforcing layer 145 are steel wire, and the number of ends preferably is not less than 17 ends/50 mm and not greater than 30 ends/50 mm. As a result, the strength of the belt plies 141, 142, 143, 145 are properly ensured.

Moreover, a modulus E1 at 100% elongation of the coating rubber of the large angle belt 141 and a modulus Es at 100% elongation of the coating rubber of the circumferential reinforcing layer 145 preferably have a relationship satisfying 0.90≤Es/E1≤1.10 (see FIG. 4). Moreover, respective moduli E2, E3 at 100% elongation of the coating rubbers of the pair of cross belts 142, 143, and the modulus Es at 100% elongation of the coating rubber of the circumferential reinforcing layer 145 preferably have relationships satisfying 0.90≤Es/E2≤1.10 and 0.90≤Es/E3≤1.10. Moreover, the modulus Es at 100% elongation of the coating rubber of the circumferential reinforcing layer 145 preferably is in a range satisfying 4.5 MPa≤Es≤7.5 MPa. As a result, the moduli of the belt plies 141, 142, 143, 145 are made appropriate.

The modulus at 100% elongation is measured in a tensile test at ambient temperature in conformance with JIS K6251 (using dumbbell no. 3).

Moreover, a breaking elongation λ1 of the coating rubber of the large angle belt 141 is preferably equal to or greater than 200% (see FIG. 4). Moreover, respective breaking elongations λ2, λ3 of the coating rubbers of the pair of cross belts 142, 143 are preferably in ranges satisfying 200%≤λ2 and 300%≤λ3. Furthermore, a breaking elongation λs of the coating rubber of the circumferential reinforcing layer 145 is preferably equal to or greater than 200%. As a result, the durability of the belt plies 141 142, 143, 145 is properly ensured.

Breaking elongation is measured by performing a tensile test on a test sample of the JIS-K7162 specification 1B shape (dumbbell shape with a thickness of 3 mm) using a tensile tester (INSTRON 5585H manufactured by Instron Corp.) conforming to JIS-K7161 at a pulling speed of 2 mm/min.

Elongation of the belt cords that configure the circumferential reinforcing layer 145, when the belt cords are components, is preferably not less than 1.0% and not greater than 2.5% when the tensile load is from 100 N to 300 N, and, when the belt cords are of a tire (when removed from the tire), is preferably not less than 0.5% and not greater than 2.0% when the tensile load is from 500 N to 1000 N. The belt cords (high elongation steel wire) have a good elongation ratio when a low load is applied compared with normal steel wire, so the belt cords can withstand loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Also, as illustrated in FIG. 3, the circumferential reinforcing layer 145 is preferably disposed on the inner side of the left and right edge portions of the narrower cross belt 143 of the pair of cross belts 142, 143 in the tire width direction. Additionally, the width Wb3 of the narrower cross belt 143 and a distance S from an edge portion of the circumferential direction reinforcing layer 145 to an edge portion of the narrower cross belt 143 is preferably in a range satisfying 0.03≤S/Wb≤0.12. As a result, the distance between the end portions of the width Wb3 of the cross belt 143 and the end portions of the circumferential reinforcing layer 145 is properly ensured. This point is the same even if the circumferential reinforcing layer 145 has a divided structure (not illustrated).

The distance S of the circumferential reinforcing layer 145 is measured as a distance in the tire width direction when the tire is assembled on a specified rim, inflated to a specified inner pressure, and no load is applied.

Further, in the configuration in FIG. 1, the circumferential reinforcing layer 145 is configured by a single steel wire wound in a spiral manner as illustrated in FIG. 3. However, the configuration is not limited thereto, and the circumferential reinforcing layer 145 may also be configured by a plurality of wires wound spirally and running parallel to each other (multiple winding structure). In this case, preferably, the number of wires is 5 or less. Additionally, the width of winding per unit when five wires are wound in multiple layers is preferably not greater than 12 mm. As a result, a plurality of wires (not less than two and not greater than five wires) can be wound properly at a slant within a range of ±5° with respect to the tire circumferential direction.

Additionally, in the configuration in FIG. 2, the circumferential reinforcing layer 145 is disposed so as to be interposed between the pair of cross belts 142, 143 (see FIG. 2). However, the circumferential reinforcing layer 145 is not limited as such, and may also disposed on the outer side of the pair of cross belts 142, 143 (not illustrated) in the tire radial direction. Additionally, the circumferential reinforcing layer 145 may also be disposed on the inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated).

The breaking elongation of the tread rubber 15 in the pneumatic tire 1 is preferably in a range of 350% or more. As a result, the strength of the tread rubber 15 is ensured and the occurrence of tearing in the outermost circumferential main groove 2 is suppressed. While the upper limit of the breaking elongation of the tread rubber 15 is not limited, the breaking elongation is constrained due to the type of the rubber compound of the tread rubber 15.

The hardness of the tread rubber 15 in the pneumatic tire 1 is preferably in a range of 70 or less. As a result, the strength of the tread rubber 15 is ensured and the occurrence of tearing in the outermost circumferential main groove 2 is suppressed. While the upper limit of the hardness of the tread rubber 15 is not limited, the hardness is constrained due to the type of the rubber compound of the tread rubber 15.

Here, "rubber hardness" refers to JIS-A hardness in accordance with JIS-K6263.

[Round Shaped Shoulder Portion]

FIG. 6 is an explanatory view of a modified example of the pneumatic tire depicted in FIG. 1. FIG. 6 illustrates a configuration having a shoulder portion with a round shape.

In the configuration in FIG. 1, the shoulder portion has a square shape in which the tire ground contact end T and tread end P are in accord, as illustrated in FIG. 2.

However, the shoulder portion is not limited as such and may also have a round shape, as illustrated in FIG. 6. In such a case, an intersection P' is taken from the tread portion profile and the side wall portion profile when viewed as a cross-section from the tire meridian direction, and the tread end P is taken as the bottom of a perpendicular line drawn from the intersection P' to the shoulder portion. Therefore, the tire ground contact end T and the tread end P normally are in mutually different locations.

[Belt Edge Cushion Two-Color Structure]

Figure 7:
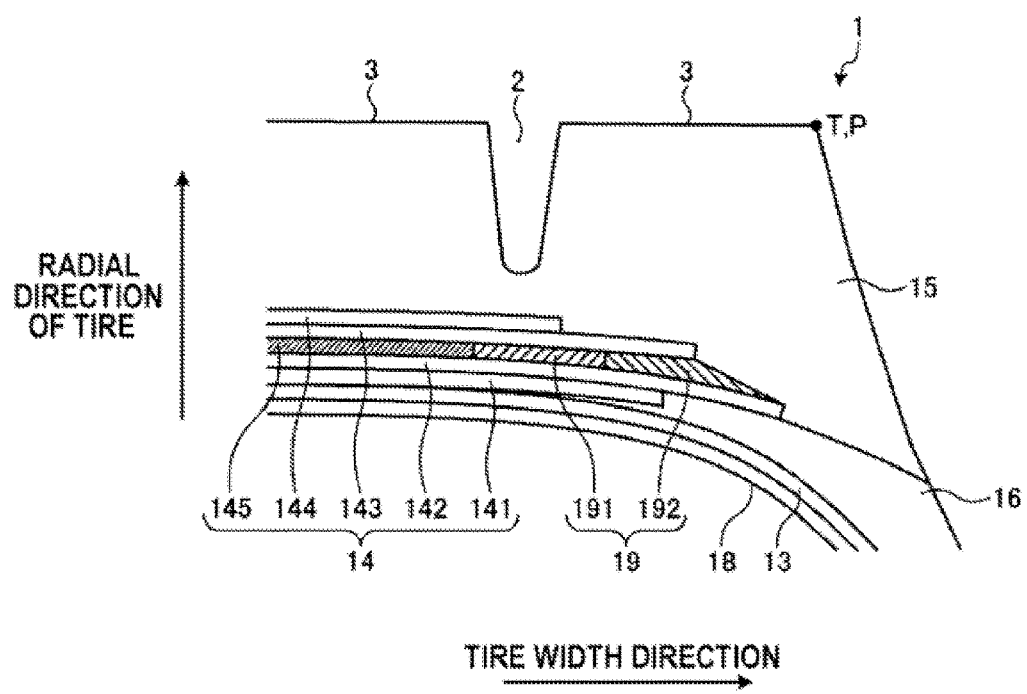
FIG. 7 is an explanatory view illustrating a modified example of the pneumatic tire depicted in FIG. 1.

FIG. 7 is an explanatory view of a modified example of the pneumatic tire depicted in FIG. 1. FIG. 7 is an enlarged view of an end portion of the belt layer 14 on the outer side in the tire width direction. The circumferential reinforcing layer 145 and the belt edge cushion 19 in FIG. 6 are indicated by hatching.

In the configuration illustrated in FIG. 1, the circumferential reinforcing layer 145 is disposed on the inner side of the left and right edge portions of the narrower cross belt 143 of the pair of cross belts 142, 143 in the tire width direction. The belt edge cushion 19 is disposed so as to be interposed between the pair of cross belts 142, 143 at a position corresponding to the edge portions of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than that of the coating rubber of the cross belts 142, 143. Specifically, the modulus E at 100% elongation of the belt edge cushion 19 and a modulus Eco of the coating rubber have a relationship satisfying $0.60 \leq E/Eco \leq 0.95$. As a result, there is an advantage that the occurrence of separation of rubber materials between the pair of cross belts 142, 143 and in a region on the outer side in the tire width direction of the circumferential reinforcing layer 145 is suppressed.

Conversely, according to the configuration illustrated in FIG. 7, the belt edge cushion 19 in the configuration illustrated in FIG. 1 has a two-color structure composed of a stress relief rubber 191 and an end portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The end portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191.

Therefore, when viewed as a cross-section from the tire meridian direction, the belt edge cushion 19 has a structure composed by disposing the stress relief rubber 191 and the end portion relief rubber 192 side-by-side in the tire width direction to fill a region from the end portion of the circumferential reinforcing layer 145 on the outer side in the tire width direction to the edge portion of the pair of cross belts 142, 143.

Additionally, a modulus Ein at 100% elongation of the stress relief rubber 191 and the modulus Es at 100% elongation of the coating rubber of the circumferential reinforcing layer 145 have a relationship satisfying Ein<Es in the configuration in FIG. 7. Specifically, the modulus Ein of the stress relief rubber 191 and the modulus Es of the circumferential reinforcing layer 145 preferably have a relationship satisfying $0.6 \leq Ein/Es \leq 0.9$.

Moreover, in the configuration illustrated in FIG. 7, the modulus Ein at 100% elongation of the stress relief rubber 191 and a modulus Eco at 100% elongation of the coating rubber of the cross belts 142, 143 have a relationship satisfying Ein<Eco. Specifically, the modulus Ein of the stress relief rubber 191 and the modulus Eco of the coating rubber preferably have a relationship satisfying $0.6 \leq Ein/Eco \leq 0.9$.

Additionally a modulus Eout at 100% elongation of the end portion relief rubber 192 and the modulus Ein at 100% elongation of the stress relief rubber 191 preferably have a relationship satisfying Eout<Ein in the configuration in FIG. 7. Additionally, the modulus Ein at 100% elongation of the stress relief rubber 191 preferably is within a range satisfying $4.0 \text{ MPa} \leq Ein \leq 5.5 \text{ MPa}$.

Since the stress relief rubber 191 is disposed on the outer side of the circumferential reinforcing layer 145 in the tire width direction in the configuration illustrated in FIG. 7, shearing strain of the peripheral rubbers between the edge portions of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, separation of the peripheral rubbers of the circumferential reinforcing layer 145 is suppressed.

Effect

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). Moreover, the belt layer 14 is formed by laminating the pair of cross belts 142, 143 having a belt angle, as an absolute value, of not less than 10° and not greater than 45° and having belt angles of mutually opposite signs, and the circumferential reinforcing layer 145 having a belt angle within a range of ±5° with respect to the tire circumferential direction (see FIG. 3). The distance Gcc from the tread profile to the tire inner circumferential surface along the tire equatorial plane CL, and the distance Gsh from the tread end P to the tire inner circumferential surface have a relationship satisfying $1.10 \leq Gsh/Gcc$ (See FIG. 2). The shoulder drop amount Dt of the tread profile at the tire ground contact end T and the outer diameter SH of the tread profile at the tire equatorial plane CL have the relationship satisfying $0 \leq Dt/SH \leq 0.015$.

According to this configuration, (1) the ratio Gsh/Gcc is increased whereby the tread surface has a flat shape (approximately parallel to the tire rotational axis) as a whole and the volume (distance Gsh) of a tread rubber 15 at the shoulder portion is ensured (see FIGS. 1 and 2). As a result, the amount of deformation of the shoulder portion while the tire is in contact with the ground is reduced and the stiffness of the shoulder land portion is properly ensured. Further, (2) the shoulder drop amount Dt of the tread profile at the tire ground contact end T is made appropriate. Consequently, the ground contact patch pressure of a shoulder land portion 3 while the tire is in contact with the ground is increased which is advantageous in improving the wet performance of the tire.

The shoulder drop amount De of the tread profile at the end portion of the circumferential reinforcing layer 145 and the shoulder drop amount Dt of the tread profile at the tire ground contact end T have the relationship satisfying $0.25 \leq De/Dt \leq 0.65$ in the pneumatic tire 1 (see FIG. 2). There is an advantage in that the ratio De/Dt is made appropriate according to this configuration. That is, the ground contact patch pressure of the shoulder land portion 3 while the tire is in contact with the ground is increased which leads to an improvement in the wet performance of the tire due to the ratio De/Dt being equal to or greater than 0.25. Due to the ratio De/Dt being equal to or less than 0.65, an increase in heat generation is suppressed because the tread rubber is not disposed in an excessive amount, and thus durability of the tire is ensured.

The ground contact width Wsh of the shoulder land portion 3 and the tread width TW in the pneumatic tire 1 have the relationship satisfying $0.1 \leq Wsh/TW \leq 0.2$ (see FIG. 2). As a result, there is an advantage in that the ground contact width Wsh of the shoulder land portion 3 is made appropriate according to this configuration. That is, due to the ratio Wsh/TW being equal to or greater than 0.1, the ground contact area of the shoulder land portion 3 is ensured and uneven wear resistance of the tire is ensured. The ground contact patch pressure of the shoulder land portion 3 while the tire is in contact with the ground is increased due to the ratio Wsh/TW being equal to or less than 0.2 which leads to an improvement in the wet performance of the tire.

The ground contact width Wcc of the land portion 3 closest to the tire equatorial plane CL and the ground contact width Wsh of the shoulder land portion 3 have the relationship satisfying $0.80 \leq Wsh/Wcc \leq 1.20$ in the pneumatic tire 1 (see FIG. 2). This has the advantage of providing an appropriate Wsh/Wcc ratio. That is, due to the ratio Wsh/Wcc being equal to or greater than 0.80, the ground contact patch pressure of the shoulder land portion 3 is properly ensured and the uneven wear resistance of the tire is suppressed. Meanwhile, even if the relationship satisfies $1.20<Wsh/Wcc$, the effect of increase in the ground contact patch pressure in the shoulder land portion 3 due to that the ground contact width Wsh is increased is small.

Additionally, the tread width TW and the width Ws of the circumferential reinforcing layer 145 in the pneumatic tire 1 have the relationship satisfying $0.70 \leq Ws/TW \leq 0.90$ (see FIG. 1). According to this configuration, there is an advantage in that the amount of deviation of the shoulder portion 3 when the tire is in contact with the ground is effectively reduced due to the appropriateness of the ratio Ws/TW between the tread width TW and the width Ws of the circumferential reinforcing layer 145 (see FIGS. 4B and 5). That is, the width Ws of the circumferential reinforcing layer 145 is properly ensured and the amount of deviation of the shoulder portion 3 when the tire is in contact with the ground is reduced due to the ratio Ws/TW being equal to or greater than 0.70. Meanwhile, even if the ratio Ws/TW is less than or equal to 0.90, deformation at the belt ply end portions is reduced due to deformation of the belt ply end portions being suppressed when the tire is in contact with the ground.

The groove area ratio A in the tire ground contact patch in the pneumatic tire 1 is in a range satisfying $0.20 \leq A \leq 0.30$. As a result, there is an advantage that the groove area ratio A is made appropriate. That is, the groove area is properly ensured and tire wet performance is improved due to the groove area ratio A being equal to or greater than 0.20. Meanwhile, an excessive increase in the groove area is suppressed and the uneven wear resistance of the tire is properly ensured due to the groove area ratio A being less than or equal to 0.30.

A loss tangent tan δ of the tread rubber 15 is in a range satisfying $0.10 \leq \tan \delta$ in the pneumatic tire 1. As a result, there is an advantage in that the loss tangent tan δ of the tread rubber 15 is properly ensured and the wet performance of the tire is improved.

Moreover, in the pneumatic tire 1, the belt cords that configure the circumferential reinforcing layer 145 are steel wire, and the number of ends of the circumferential reinforcing layer 145 is not less than 17 ends/50 mm and not greater than 30 ends/50 mm. As a result, there is an advantage in that the number of ends of the belt cords of the circumferential reinforcing layer 145 is made appropriate. Specifically, the strength of the circumferential reinforcing layer 145 is properly ensured due to the circumferential reinforcing layer 145 having at least 17 ends/50 mm. Moreover, the amount of rubber of the coating rubber of the circumferential reinforcing layer 145 is properly ensured and separation of the rubber materials between the adjacent belt plies (the pair of cross belts 142, 143 and the circumferential reinforcing layer 145 in FIG. 3) is suppressed due to the circumferential reinforcing layer 145 having not greater than 30 ends/50 mm.

In the pneumatic tire 1, the elongation of the belt cords from which the circumferential reinforcing layer 145 is configured, when the belt cords are components, is preferably not less than 1.0% and not greater than 2.5% when the tensile load is from 100 N to 300 N. As a result, there is an advantage that the effect of suppressing radial growth in the center region is properly ensured due to the circumferential reinforcing layer 145.

In the pneumatic tire 1, elongation of the belt cords that configure the circumferential reinforcing layer 145, when the belt cords are of a tire, is not less than 0.5% and not greater than 2.0% when the tensile load is from 500 N to 1000 N. As a result, there is an advantage that the effect of suppressing radial growth in the center region is properly ensured due to the circumferential reinforcing layer 145.

In the pneumatic tire 1, the circumferential reinforcing layer 145 is disposed on the inner side of the left and right edge portions of the narrower cross belt 143 of the pair of cross belts 142, 143 (see FIG. 3) in the tire width direction. The pneumatic tire 1 includes the stress relief rubber 191 disposed between the pair of cross belts 142, 143 and on the outer side of the circumferential reinforcing layer 145 in the tire width direction so as to be adjacent to the circumferential reinforcing layer 145, and the end portion relief rubber 192 disposed between the pair of cross belts 142, 143 and on the outer side of the stress relief rubber 191 in the tire width direction and at a position corresponding to the edge portions of the pair of cross belts 142, 143 so as to be adjacent to the stress relief rubber 191 (see FIG. 7).

In such a configuration, there is an advantage that fatigue rupture of the peripheral rubbers at the edge portion of the circumferential reinforcing layer 145 is suppressed due to the circumferential reinforcing layer 145 being disposed on the inner side of the left and right edge portions of the narrower cross belt 143 of the pair of cross belts 142, 143 in the tire width direction. Since the stress relief rubber 191 is disposed on the outer side of the circumferential reinforcing layer 145 in the tire width direction, shearing strain of the peripheral rubbers between the edge portions of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, there is an advantage that separation of the peripheral rubbers of the circumferential reinforcing layer 145 is suppressed.

The modulus Ein at 100% elongation of the stress relief rubber 191 and the modulus Eco at 100% elongation of the coating rubber of the pair of cross belts 142, 143 have the relationship satisfying Ein<Eco in the pneumatic tire 1. As a result, there is an advantage that the modulus Ein of the stress relief rubber 191 is made appropriate and the shearing strain of the peripheral rubbers between the edge portions of the circumferential reinforcing layer 145 and the cross belts 142, 143 is alleviated.

The modulus Ein at 100% elongation of the stress relief rubber 191 and the modulus Eco at 100% elongation of the coating rubber of the pair of cross belts 142, 143 have the relationship satisfying $0.6 \leq Ein/Eco \leq 0.9$ in the pneumatic tire 1. As a result, there is an advantage that the ratio Ein/Eco is made appropriate and the shearing strain of the peripheral rubbers between the edge portions of the circumferential reinforcing layer 145 and the cross belts 142, 143 is alleviated.

Additionally, in the pneumatic tire 1, the modulus Ein at 100% elongation of the stress relief rubber 191 is within a range satisfying $4.0 \text{ MPa} \leq Ein \leq 5.5 \text{ MPa}$ (see FIG. 7). As a result, there is an advantage that the modulus Ein of the stress relief rubber 191 is made appropriate and the shearing strain of the peripheral rubbers between the edge portions of the circumferential reinforcing layer 145 and the cross belts 142, 143 is alleviated.

The belt layer 14 includes the large angle belt 141 having a belt angle not less than 45° and not greater than 70° as an absolute value in the pneumatic tire 1 (see FIGS. 1 and 3). As a result, there is an advantage in that the belt layer 14 is reinforced and distortion of the end portions of the belt layer 14 when the tire is in contact with the ground is suppressed.

Additionally, the width Wb1 of the large angle belt 141 and the width Wb3 of the narrower cross belt 143 of the pair of cross belts 142, 143 have the relationship satisfying $0.85 \leq Wb1/Wb3 \leq 1.05$ in the pneumatic tire 1 (See FIG. 3). According to this configuration, the ratio Wb1/Wb3 between the width Wb1 of the large angle belt 141 and the width Wb3 of the narrower cross belt 143 is made appropriate. As a result, there is an advantage in that distortion of the end portions of the belt layer 14 when the tire is in contact with the ground is suppressed.

In the pneumatic tire 1, the circumferential reinforcing layer 145 is disposed on the inner side of the left and right edges of the narrower cross belt 143 of the pair of cross belts 142, 143 (see FIG. 3) in the tire width direction. Additionally, the width Wb3 of the narrower cross belt 143 and the distance S from the edge portion of the circumferential reinforcing layer 145 to the edge portion of the narrower cross belt 143 is preferably in the range satisfying $0.03 \leq S/Wb3 \leq 0.12$. This has the advantage of providing an appropriate positional relationship S/Wb3 between the edge portions of the cross belts 142, 143 and the edge portions of the circumferential reinforcing layer 145. Specifically, the relationship satisfying $0.03 \leq S/Wb3$ ensures an appropriate distance between the end portions of the circumferential reinforcing layer 145 and the end portions of the cross belt 143 to suppress the separation of the peripheral rubbers at the end portions of the belt plies 145 and 143. Additionally, the relationship satisfying $S/Wb3 \leq 0.12$ ensures the width Ws of the circumferential reinforcing layer 145 relative to the width Wb3 of the cross belt 143 to ensure an appropriate hoop effect from the circumferential reinforcing layer 145.

(Target of Application)

The pneumatic tire 1 is preferably applied to a heavy duty tire with an aspect ratio of not less than 40% and not greater than 70% when assembled on a regular rim, inflated with a regular inner pressure and a regular load is applied. A heavy duty tire has a higher load under use than a passenger car tire. As a result, the difference in the diameters between the disposition region of the circumferential reinforcing layer 145 in the tread surface and the region on the outer side in the tire width direction from the circumferential reinforcing layer 145 may easily increase. Moreover, a ground contact shape having an hourglass shape occurs easily in the tire having the above-mentioned low aspect ratio. Consequently, remarkable uneven wear resistance and wet performance of the abovementioned tire are achieved by applying such a heavy duty tire.

EXAMPLES

FIGS. 8A-8C include a table showing results of performance testing of pneumatic tires according to embodiments of the present technology.

Evaluations of wet performance of a plurality of mutually different pneumatic tires were conducted for the performance tests (See FIGS. 8A-8C). Pneumatic tires having the tire size 285/60R22.5 were assembled on rims having a rim size of 22.5×8.25 and the pneumatic tires were inflated with an air pressure of 900 kPa in the evaluations. The pneumatic tires were assembled on a 2-D (2 front wheels-rear-wheel drive) vehicle as a test vehicle and a load of 28.44 kN was applied to the pneumatic tires.

Evaluations pertaining to wet performance involved driving the test vehicle on the wet road surface having the pneumatic tires mounted thereon and measuring the braking distance from an initial speed of 60 km/h. Based on the measurement results, index evaluation is carried out, using the conventional example as a standard (100). A larger numerical value is better in the evaluations. In particular, an evaluation of 115 or higher indicates an effect exceptionally superior to that of the conventional example.

The pneumatic tires 1 of the Working Examples 1 to 21 have the configuration illustrated in FIGS. 1 and 3. All of the land portions 3 are ribs continuing in the tire circumferential direction. The main dimensions are set as TW=245 mm, SH=916 mm, Gcc=30 mm, and Wcc=30 mm.

A portion of the numerical ranges in the pneumatic tire of the conventional example differ from the configuration illustrated in FIGS. 1 to 3.

As illustrated in the test results, the pneumatic tires 1 of the Working Examples 1 to 21 demonstrate improved tire wet performance. In particular when comparing embodiments 1 to 13, it can be seen that an exceptionally superior effect in wet performance is achieved due to the ratios $1.20 \leq Gsh/Gcc$, $0.25 \leq De/Dt$, and $0.1 \leq Wsh/TW \leq 0.2$ being satisfied.

The invention claimed is:

1. A pneumatic tire, comprising:
a carcass layer;
a belt layer disposed on an outer side of the carcass layer in a tire radial direction;
a tread rubber disposed on an outer side of the belt layer in the tire radial direction;
at least three circumferential main grooves extending in a tire circumferential direction; and
a plurality of land portions defined by the circumferential main grooves;
the belt layer being formed by laminating a pair of cross belts having a belt angle of not less than 10° and not greater than 45° in absolute values and having belt angles of mutually opposite signs, and a circumferential reinforcing layer having a belt angle within a range of ±5° with respect to the tire circumferential direction;
a distance Gcc from a tread profile to a tire inner circumferential surface along a tire equatorial plane, and a distance Gsh from a tread end to the tire inner circumferential surface having a relationship satisfying $1.20 \leq Gsh/Gcc$;
a shoulder drop amount Dt of the tread profile at a tire ground contact end and an outer diameter SH of the tread profile along the tire equatorial plane having a relationship satisfying $0 \leq Dt/SH \leq 0.008$; and
a shoulder drop amount De of the tread profile at an end portion of the circumferential reinforcing layer and the shoulder drop amount Dt of the tread profile at the tire ground contact end have a relationship satisfying $0.32 \leq De/Dt \leq 0.65$.

2. The pneumatic tire according to claim 1, wherein, upon the left and right circumferential main grooves furthest to the outer side in a tire width direction being called outermost circumferential main grooves and the left and right land portions on the outer side in the tire width direction demarcated by the outermost circumferential main grooves being called shoulder land portions,
a ground contact width Wsh of the shoulder land portion and a tread width Tw have a relationship satisfying $0.1 \leq Wsh/TW \leq 0.2$.

3. The pneumatic tire according to claim 1, wherein, upon the left and right circumferential main grooves furthest to the outside in the tire width direction being called outermost circumferential main grooves and the left and right land portions on the outside in the tire width direction demarcated by the outermost circumferential main grooves being called shoulder land portions,
a ground contact width Wcc of the land portion closest to the tire equatorial plane and the ground contact width Wsh of the shoulder land portion have a relationship satisfying $0.80 \leq Wsh/Wcc \leq 1.20$.

4. The pneumatic tire according to claim 1, wherein a groove area ratio A in a tire ground contact patch is in a range satisfying $0.20 \leq A$.

5. The pneumatic tire according to claim 1, wherein a loss tangent tan δ of the tread rubber is in a range satisfying $0.10 \leq \tan \delta$.

6. The pneumatic tire according to claim 1, wherein belt cords of the circumferential reinforcing layer are steel wire, and the belt cords have a number of ends not less than 17 ends/50 mm and not greater than 30 ends/50 mm.

7. The pneumatic tire according to claim 1, wherein elongation of belt cords that configure the circumferential reinforcing layer, upon the belt cords being components, is not less than 1.0% and not greater than 2.5% when a tensile load is from 100 N to 300 N.

8. The pneumatic tire according to claim 1, wherein elongation of belt cords that configure the circumferential reinforcing layer, upon the belt cords being of a tire, is not less than 0.5% and not greater than 2.0% when a tensile load is from 500 N to 1000 N.

9. The pneumatic tire according to claim 1, wherein the circumferential reinforcing layer is disposed on an inner side of left and right edge portions of a narrower cross belt of the pair of cross belts in the tire width direction, and
a stress relief rubber is disposed between the pair of cross belts and disposed on the outer side of the circumferential reinforcing layer in the tire width direction so as to be adjacent to the circumferential reinforcing layer; and
an end portion relief rubber is disposed between the pair of cross belts and disposed on the outer side of the stress relief rubber in the tire width direction and in a position corresponding to an edge portion of the pair of cross belts so as to be adjacent to the stress relief rubber.

10. The pneumatic tire according to claim 9, wherein a modulus Ein at 100% elongation of the stress relief rubber and a modulus Eco at 100% elongation of coating rubber of the pair of cross belts have a relationship satisfying $Ein < Eco$.

11. The pneumatic tire according to claim 9, wherein the modulus Ein at 100% elongation of the stress relief rubber and the modulus Eco at 100% elongation of coating rubber of the pair of cross belts have a relationship satisfying $0.6 \leq Ein/Eco \leq 0.9$.

12. The pneumatic tire according to claim 9, wherein the modulus Ein at 100% elongation of the stress relief rubber is in range satisfying $4.0 \text{ MPa} \leq Ein \leq 5.5 \text{ MPa}$.

13. The pneumatic tire according to claim 1, wherein the belt layer includes the large angle belt having a belt angle not less than 45° and not greater than 70° as an absolute value.

14. The pneumatic tire according to claim 13, wherein a width Wb1 of a high angle belt and a width Wb3 of a narrower cross belt of the pair of cross belts have a relationship satisfying $0.85 \leq Wb1/Wb3 \leq 1.05$.

15. The pneumatic tire according to claim 1, wherein the circumferential reinforcing layer is disposed on the inner side of the left and right edge portions of a narrower cross belt of the pair of cross belts in the tire width direction, and
the width Wb3 of the narrower cross belt and a distance S from an edge portion of the circumferential reinforcing layer to the edge portion of the narrower cross belt have a relationship satisfying $0.03 \leq S/Wb3$.

16. The pneumatic tire according to claim 1 applied to a heavy-duty tire with an aspect ratio of 70% or less.

17. The pneumatic tire according to claim 1, wherein $1.25 \leq Gsh/Gcc$.

* * * * *